United States Patent
Kattan

(10) Patent No.: US 9,212,885 B2
(45) Date of Patent: Dec. 15, 2015

(54) TRIGONOMETER

(71) Applicant: Patrick Elie Kattan, Maghdouche - Saida - South Lebanon (LB)

(72) Inventor: Patrick Elie Kattan, Maghdouche - Saida - South Lebanon (LB)

(*) Notice: Subject to any disclaimer, the term of this patent is extended or adjusted under 35 U.S.C. 154(b) by 161 days.

(21) Appl. No.: 14/101,982

(22) Filed: Dec. 10, 2013

(65) Prior Publication Data

US 2014/0215840 A1     Aug. 7, 2014

(30) Foreign Application Priority Data

Feb. 4, 2013   (LB) ............................................ 9921

(51) Int. Cl.
  *G01B 3/56*      (2006.01)
  *G09B 23/04*   (2006.01)
  *G06G 1/06*     (2006.01)
  *G06G 1/08*     (2006.01)
  *G06G 1/10*     (2006.01)

(52) U.S. Cl.
  CPC *G01B 3/563* (2013.01); *G06G 1/06* (2013.01); *G06G 1/08* (2013.01); *G06G 1/105* (2013.01); *G09B 23/04* (2013.01)

(58) Field of Classification Search
  CPC ........ G01B 3/56; G01B 5/242; G01B 33/453; G01B 3/563; G09B 23/04; G06G 1/06; G06G 1/08; G06G 1/105
  See application file for complete search history.

(56) References Cited

U.S. PATENT DOCUMENTS

| | | | | |
|---|---|---|---|---|
| 662,977 | A * | 12/1900 | Schmelz | 33/453 |
| 1,894,886 | A * | 1/1933 | Paskowski | 33/453 |
| 2,239,229 | A * | 4/1941 | Harris | 33/453 |
| 2,460,713 | A * | 2/1949 | Richardson | 33/453 |
| 4,736,524 | A * | 4/1988 | King | 33/451 |
| 5,215,467 | A * | 6/1993 | Brischke | 434/214 |
| 6,766,583 | B2 * | 7/2004 | Economaki | 33/534 |
| 7,188,427 | B2 * | 3/2007 | Johnson | 33/471 |
| 7,278,217 | B1 * | 10/2007 | Mills | 33/276 |
| 7,469,483 | B2 * | 12/2008 | Martin | B25H 7/005 33/520 |
| 7,748,129 | B2 * | 7/2010 | Kozlowski | 33/453 |
| 2013/0291392 | A1 * | 11/2013 | Swamy et al. | 33/415 |
| 2015/0168122 | A1 * | 6/2015 | Cruickshanks | G01B 5/24 |

OTHER PUBLICATIONS

Revised Amendment Practice 37 CFR 1.121, 2014, USPTO.*
16th Annual Independent Inventors Conference Advanced Claim Drafting, Aug. 15-16, 2014, USPTO, Alexandria VA.*

* cited by examiner

*Primary Examiner* — Michael Zarroli

(57) ABSTRACT

The New Trigonometer is a device used to compute the trigonometric sine, cosine and tangent of angles. Consequently, the device could also be used to calculate the reciprocal sine, cosine, and tangent functions. The device constitutes of a protractor and a graduated ruler attached thereof. An arm is pivotally joined to the center of protractor and a second graduated ruler is pivotally joined to the arm in a way, which makes the New Trigonometer a reflection of the trigonometric circle.

4 Claims, 15 Drawing Sheets

$$\cos\alpha = \cos(\alpha + 2k\pi) \quad \sin\alpha = \sin(\alpha + 2k\pi) \quad \tan\alpha = \tan(\alpha + k\pi) \quad \cos(-\alpha) = \cos(\alpha)$$
$$\sin(-\alpha) = -\sin(\alpha) \quad\quad \cos\alpha = \sin(\frac{\pi}{2} - \alpha) \quad\quad \sin\alpha = \cos(\frac{\pi}{2} - \alpha)$$
FIG. 1 Some of the basic relationship used in trigonometry
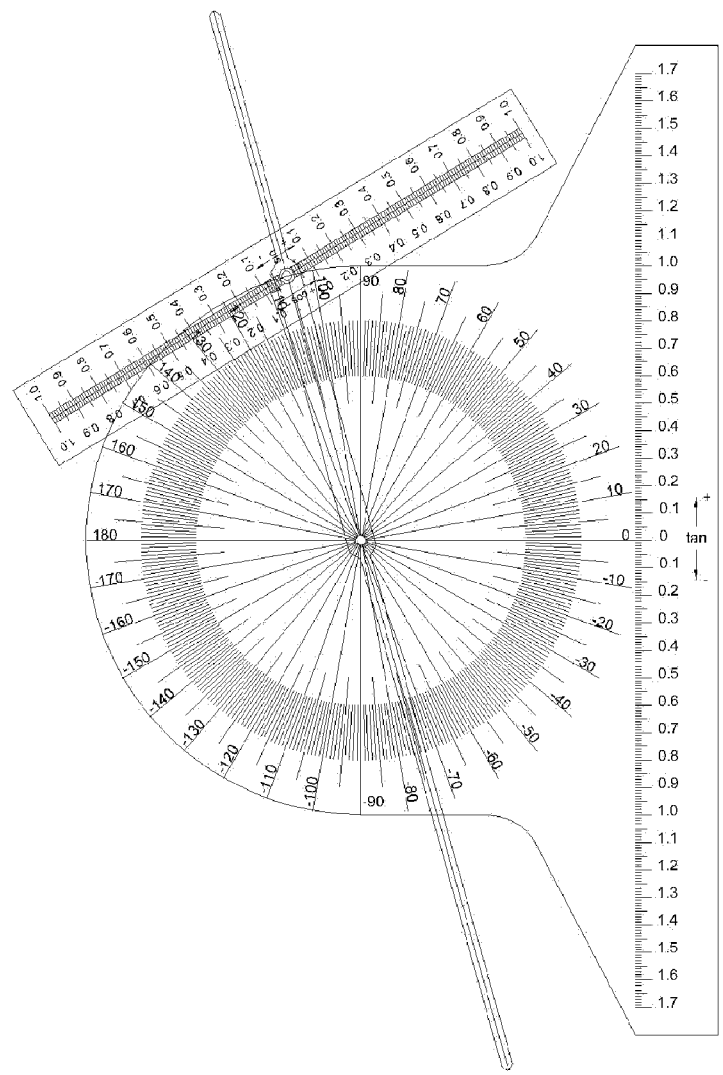
FIG. 2 The New Trigonometer - front page

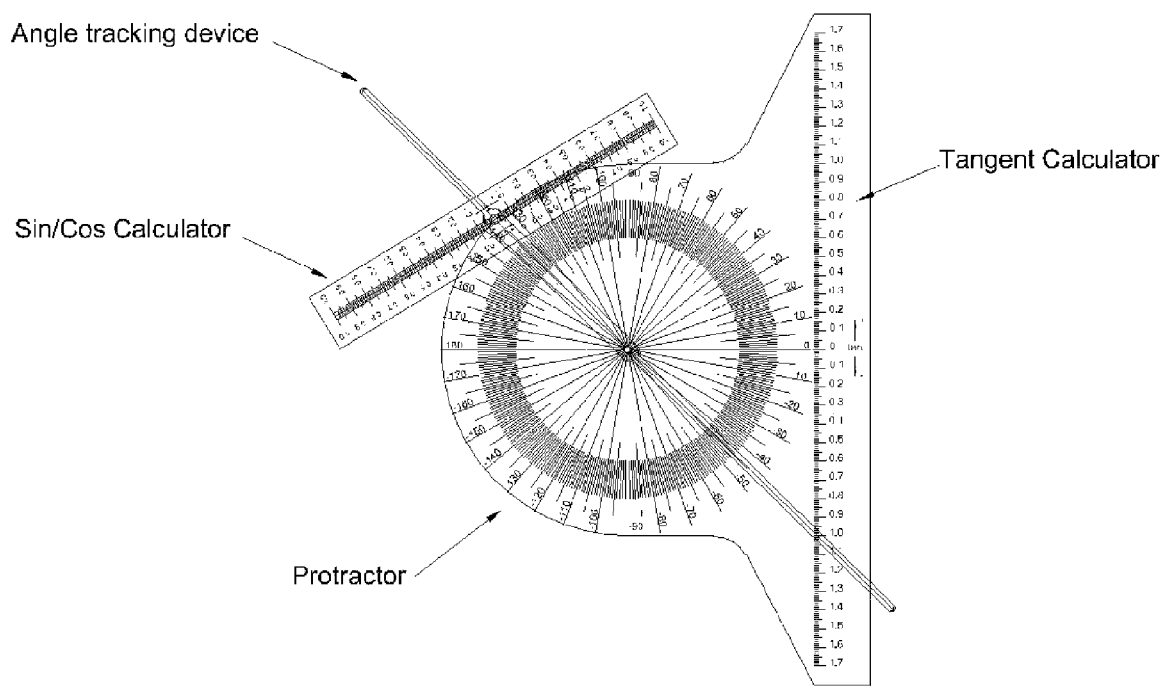
FIG. 3 Annotated representation of the New Trigonometer

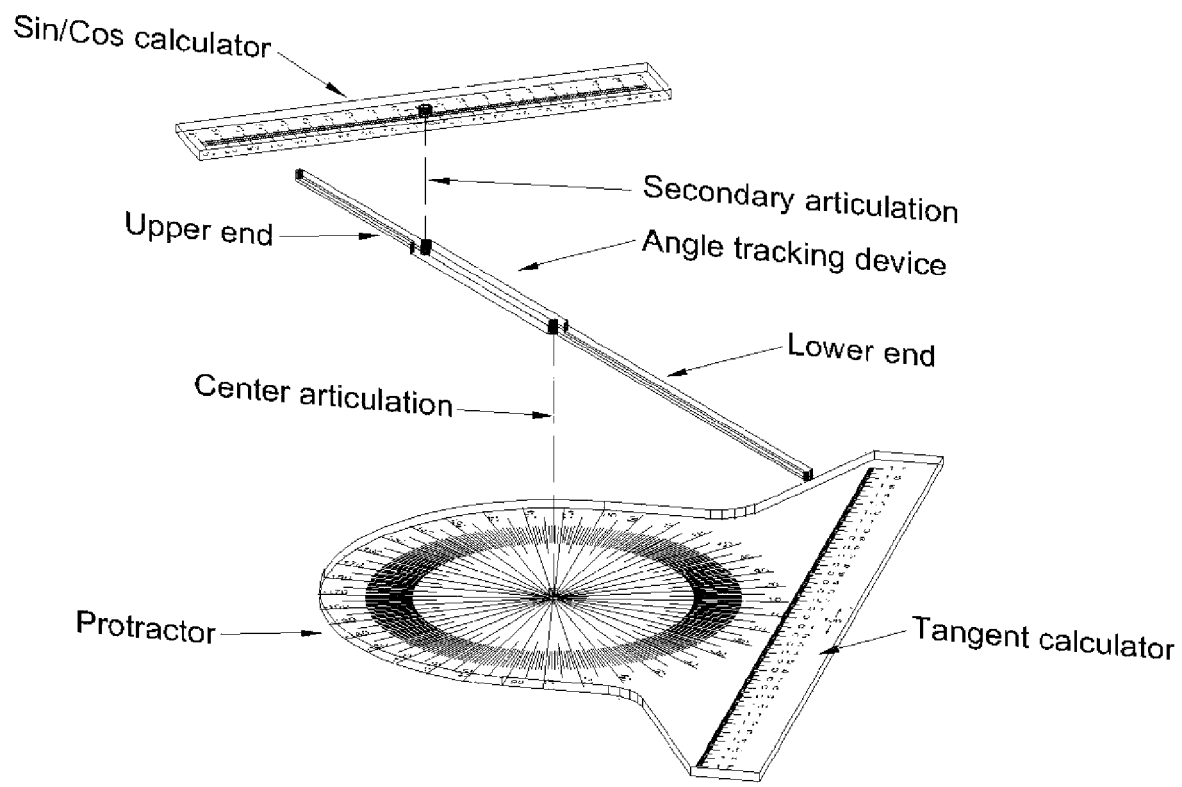
FIG. 4 Exploded view

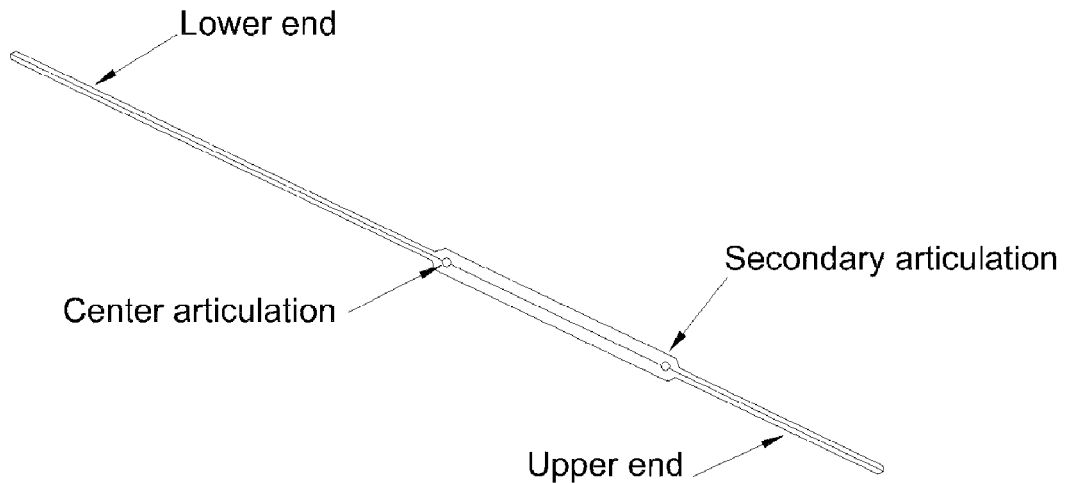
FIG. 5 The Angle Tracking Device
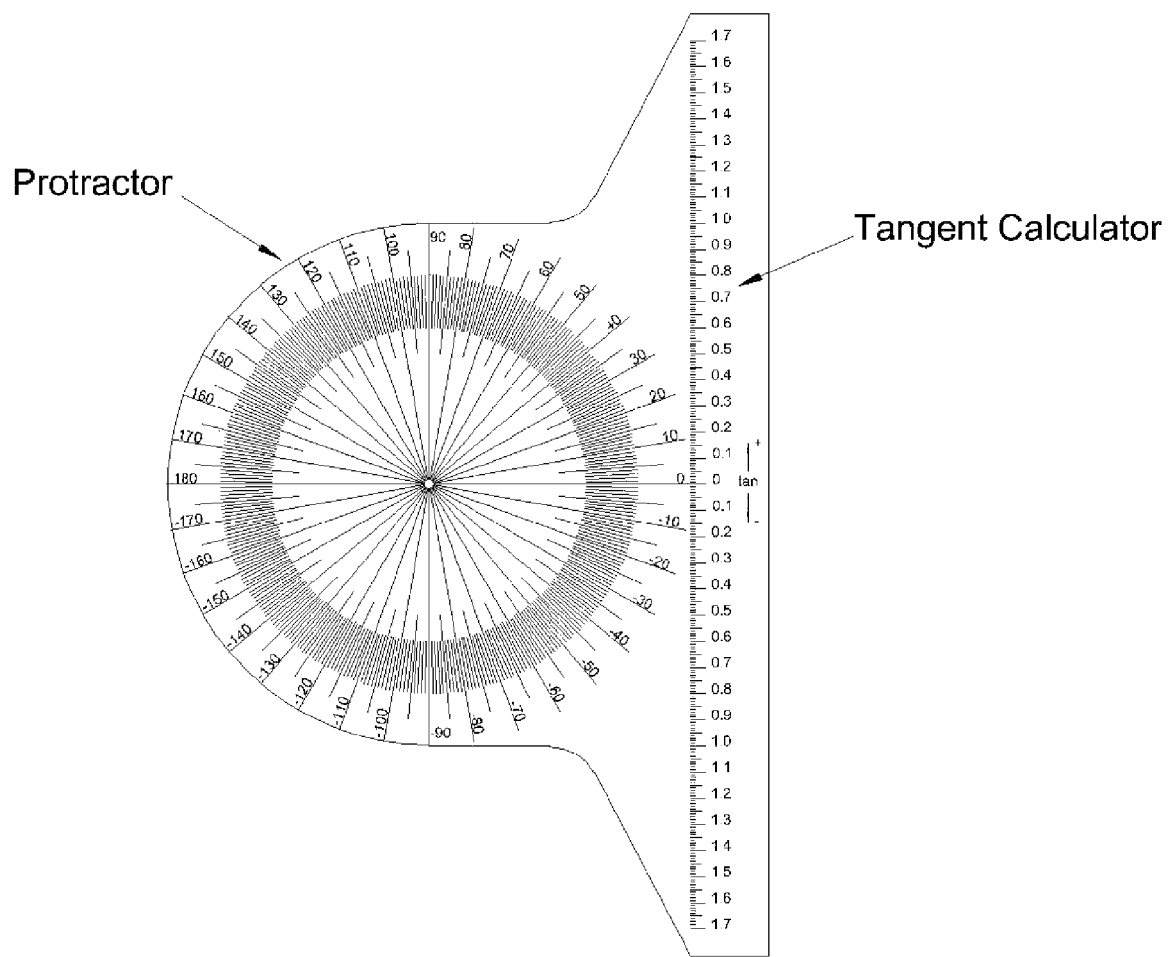
FIG. 6 The Tangent Calculator and the protractor as one entity

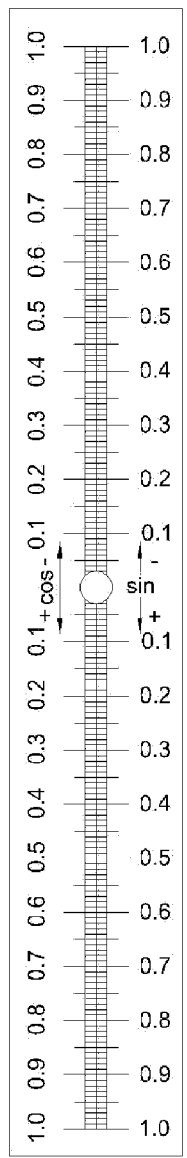
FIG. 7 The Sin/Cos Calculator in its vertical position
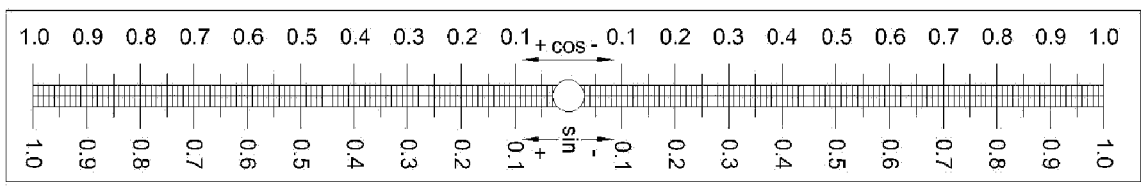
FIG. 8 The Sin/Cos Calculator in its horizontal position

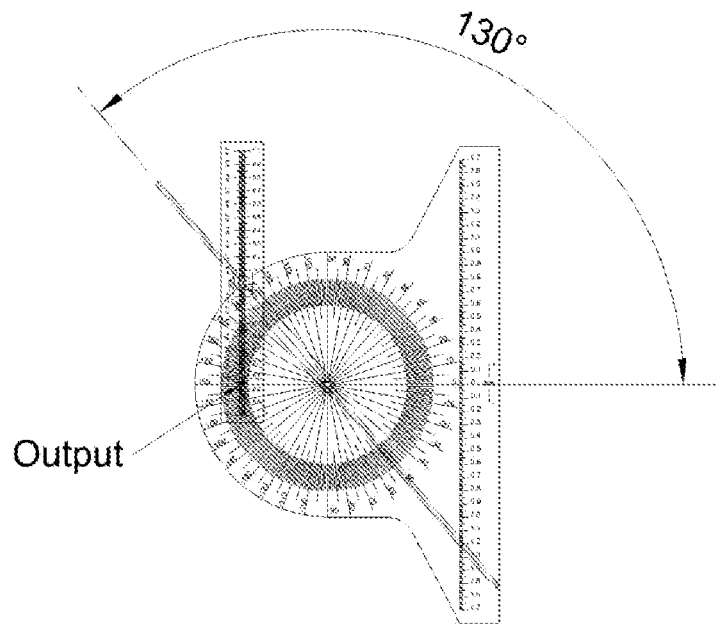
FIG. 9 Example 1 - Finding the sine of 130°
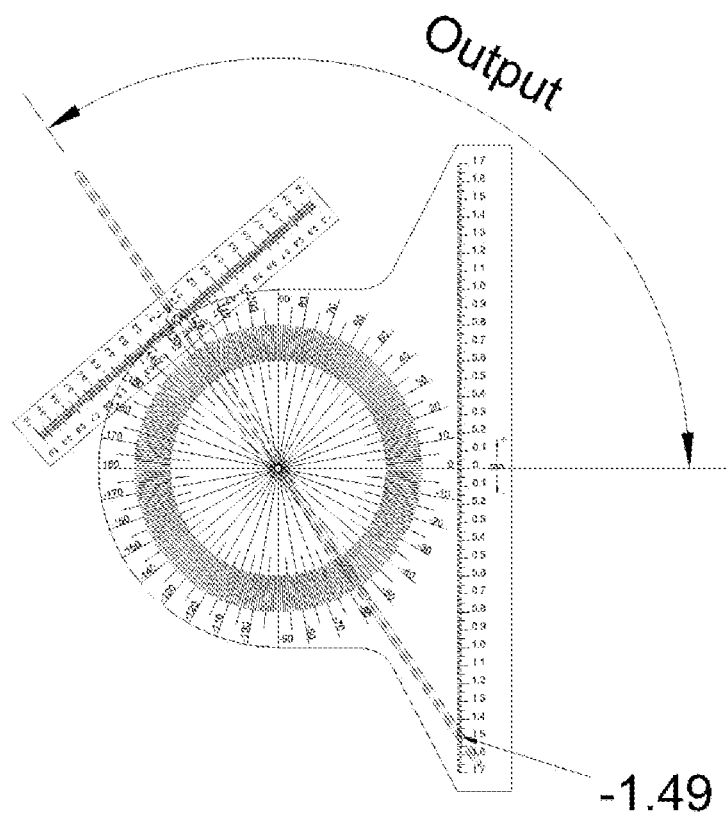
FIG. 10 Example 2 - Finding the arctan of -1.49

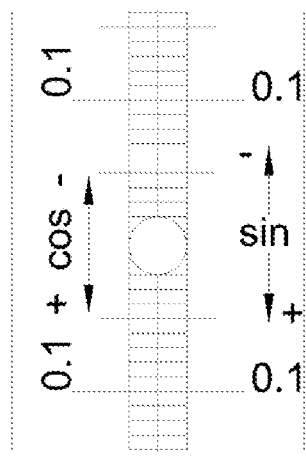
FIG. 11 Sine sign convention
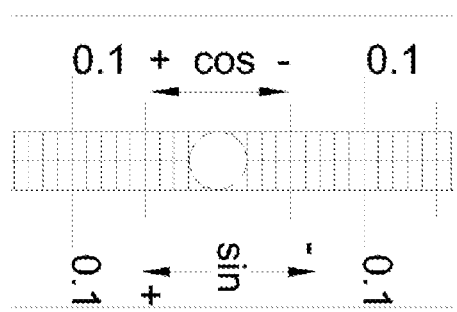
FIG. 12 Cosine sign convention
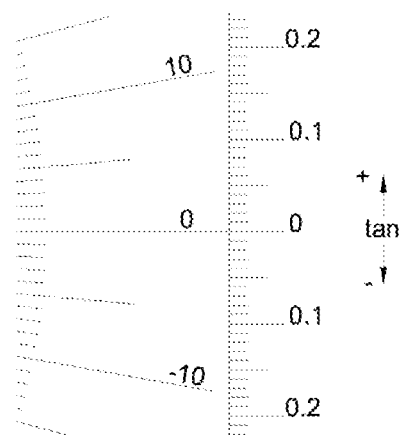
FIG. 13 Tangent sign convention

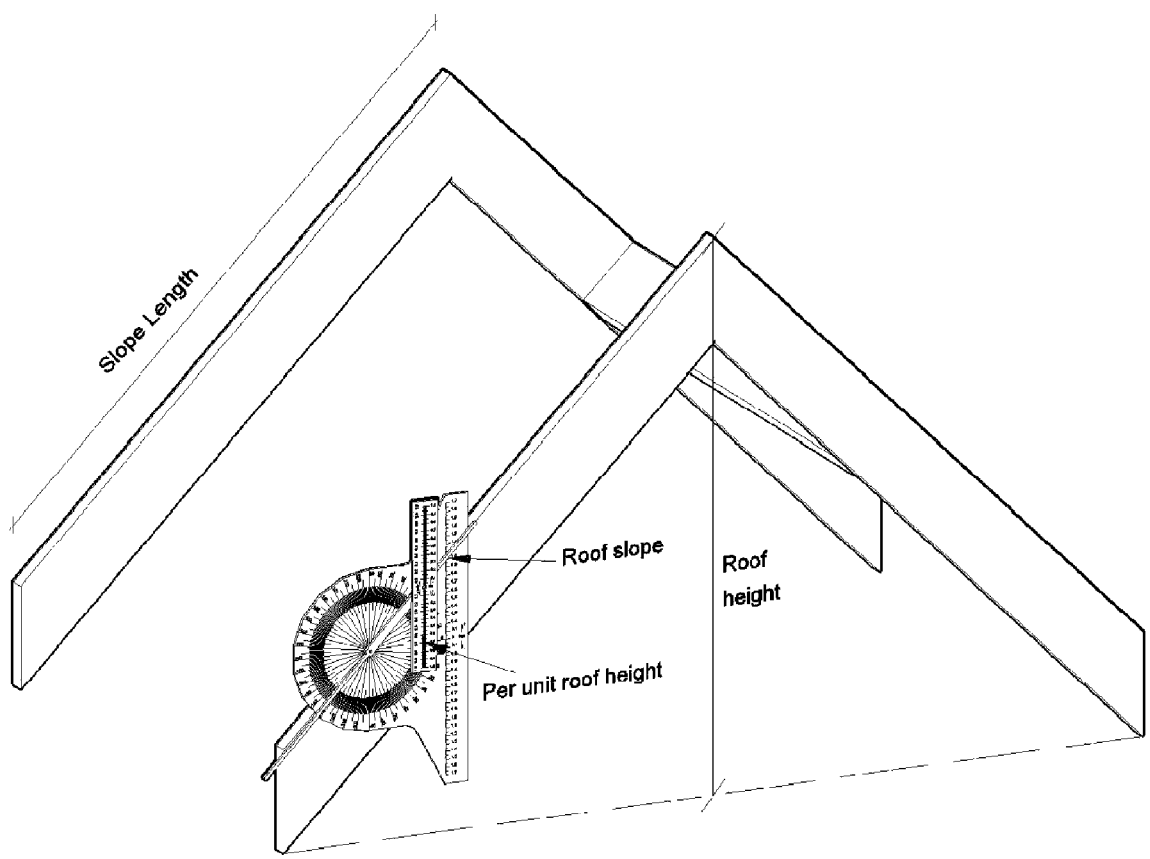
FIG. 14 Carpentry application: Find the slope and the height of a sloped roof

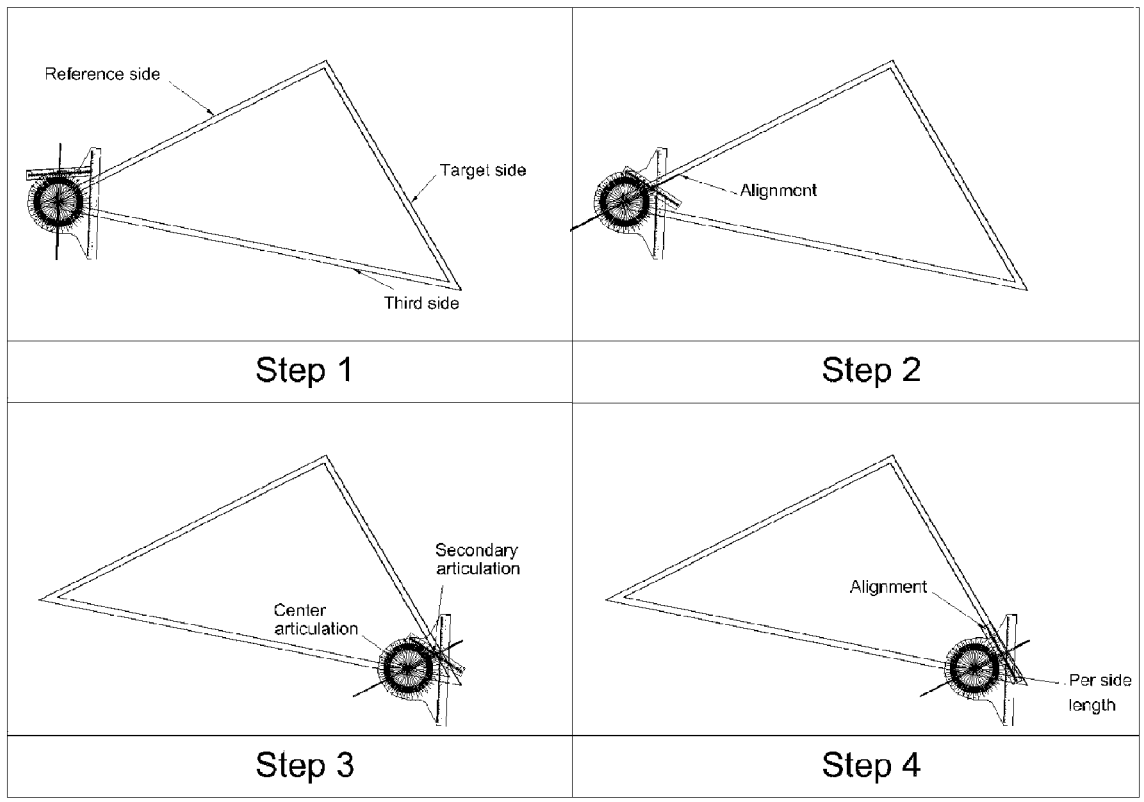
FIG. 15 Calculating the length of a triangle side, knowing any of the other side lengths

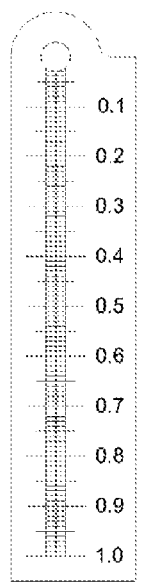
FIG. 16 Sin/Cos Calculator variant: the Lengths Calculator
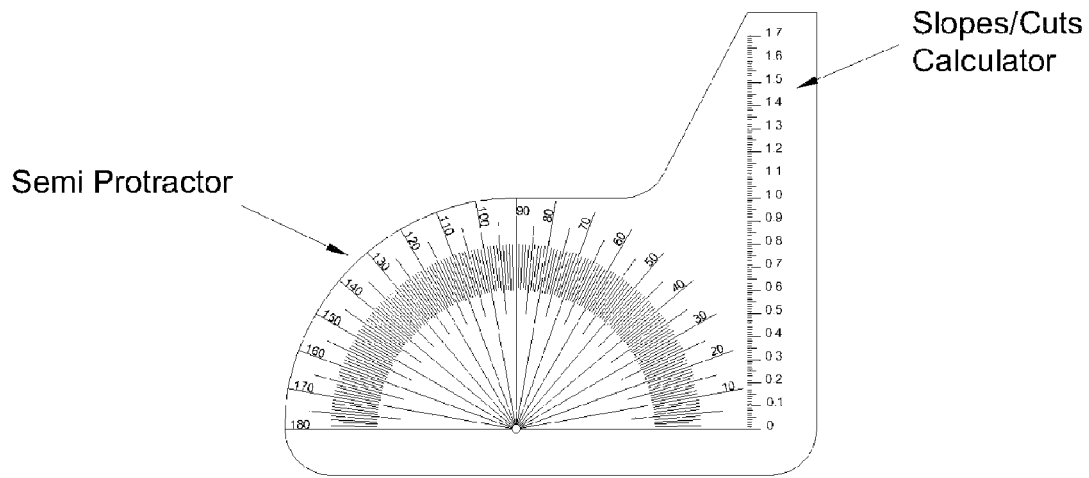
FIG. 17 The Slopes/Cuts Calculator (variant of the tangent calculator) and a semi-protractor as one entity

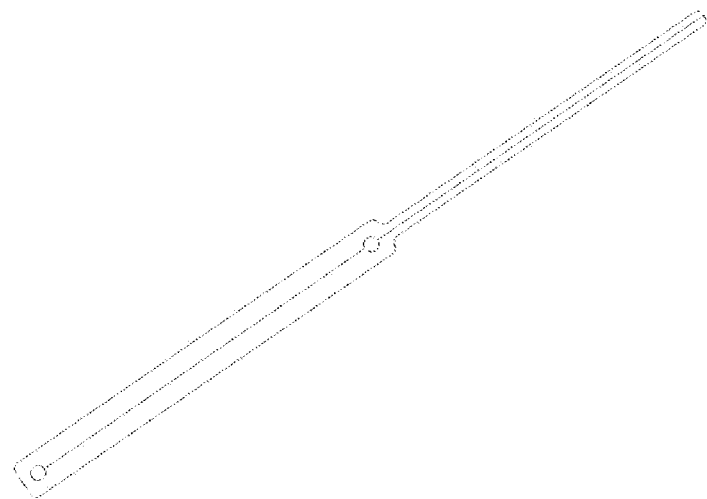
FIG. 18 Angle Tracking Device variant
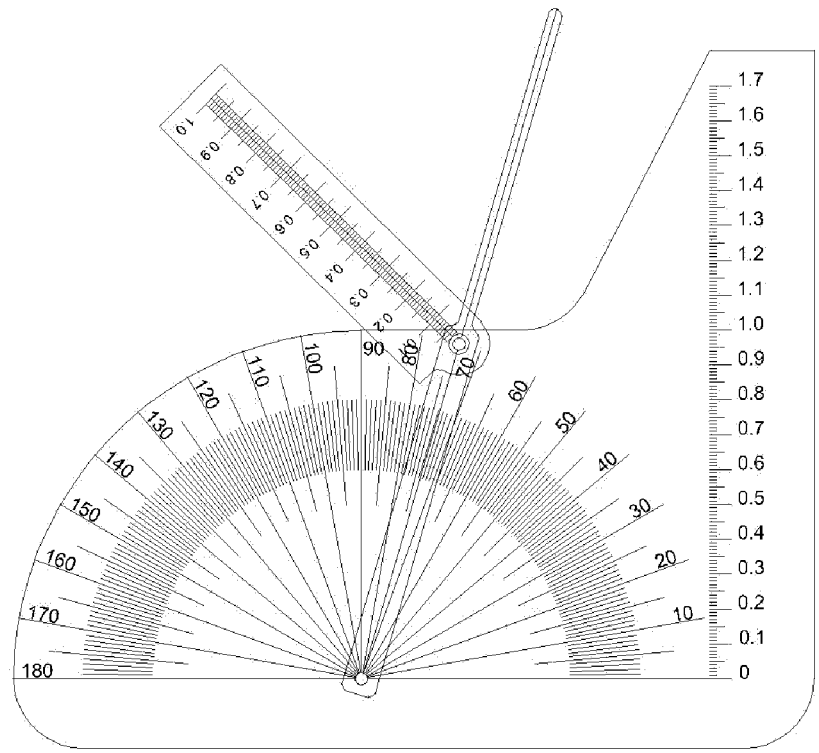
FIG. 19 Variant of the Trigonometer, specific for carpentry

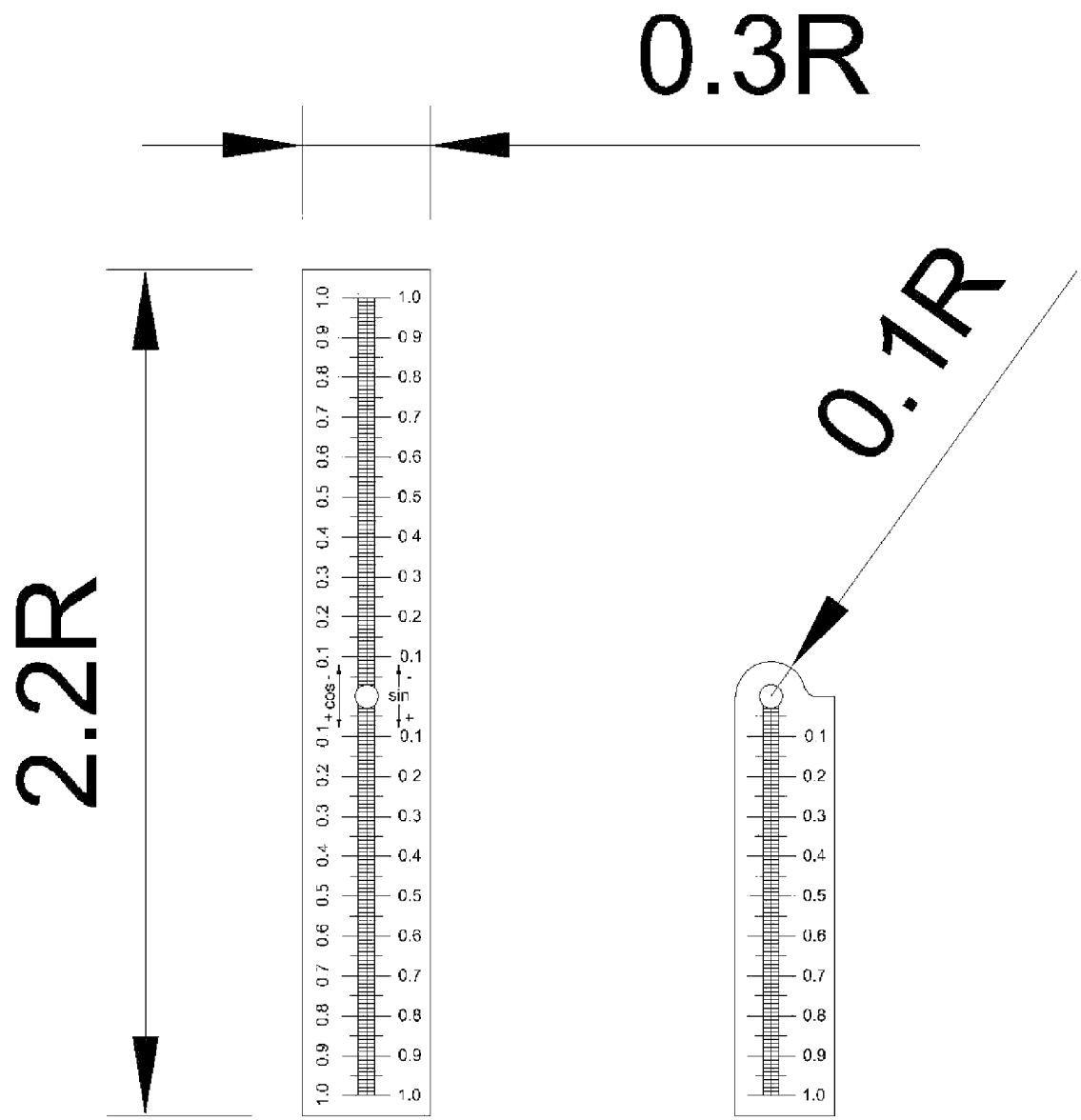
FIG. 20 Industrial drawing 1: The Sin/Cos and Lengths Calculators

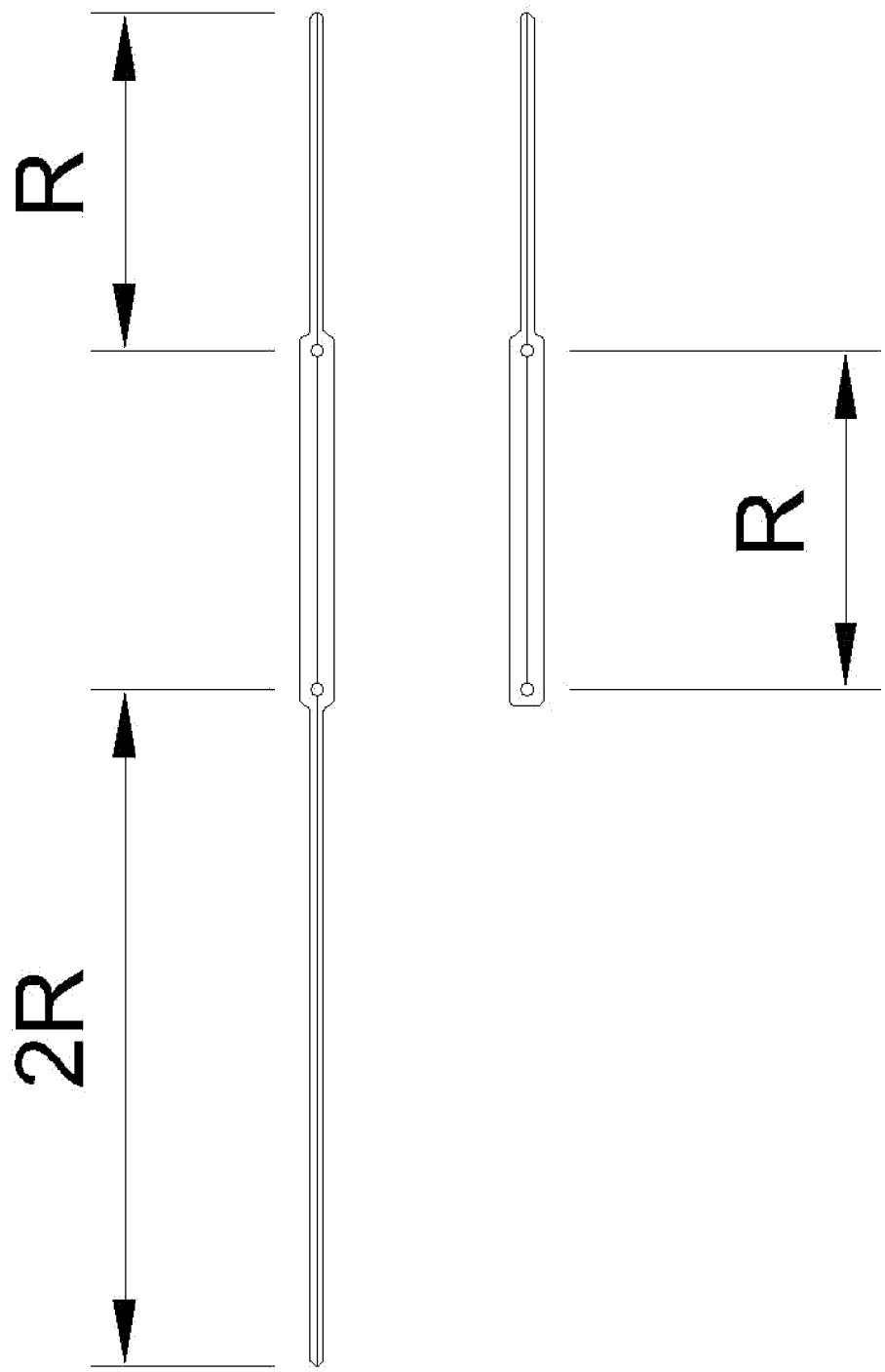
FIG. 21 Industrial drawing 2: The Angle Tracking Device and its variant

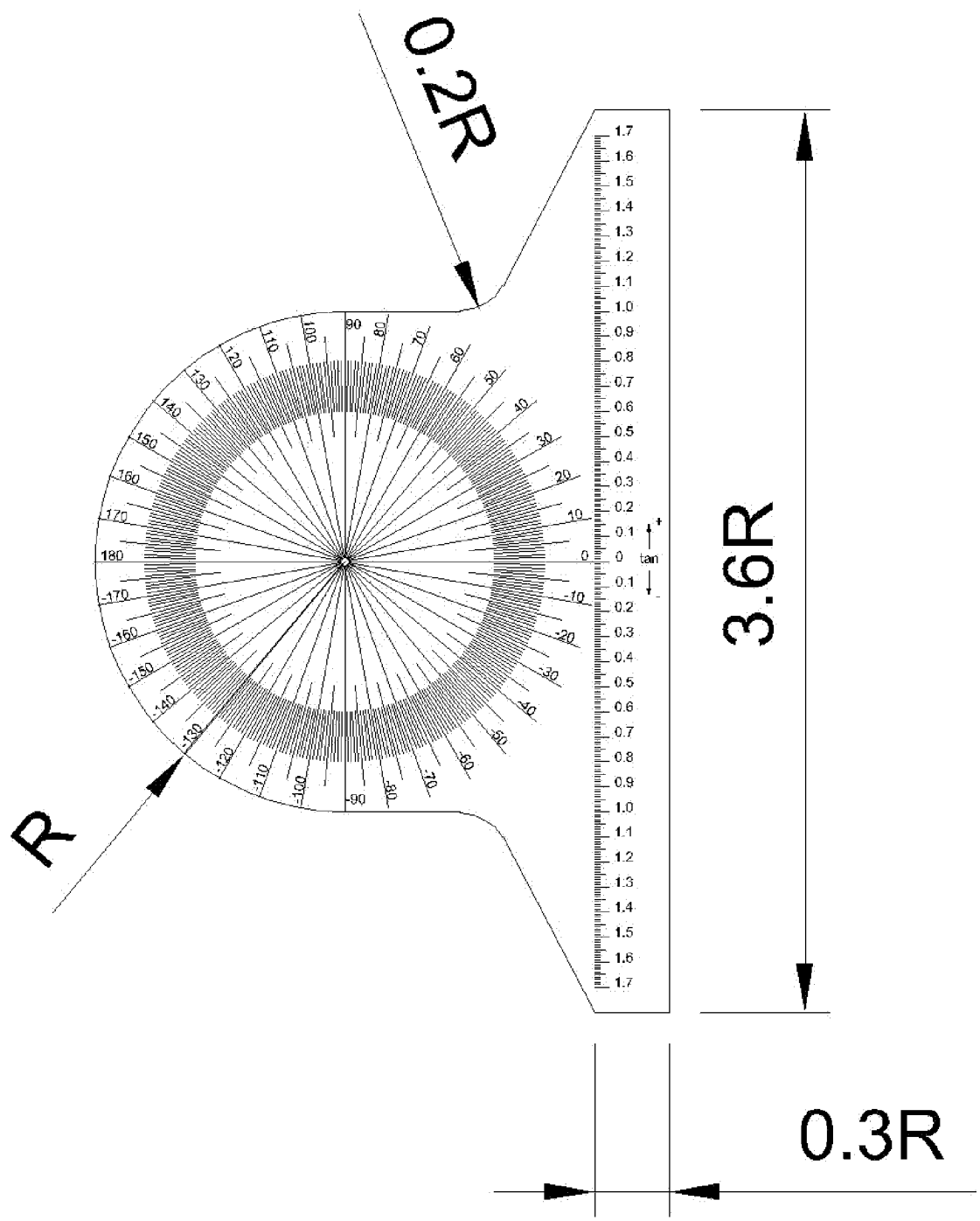
FIG. 22 Industrial drawing 3: The protractor with the Tangent Calculator

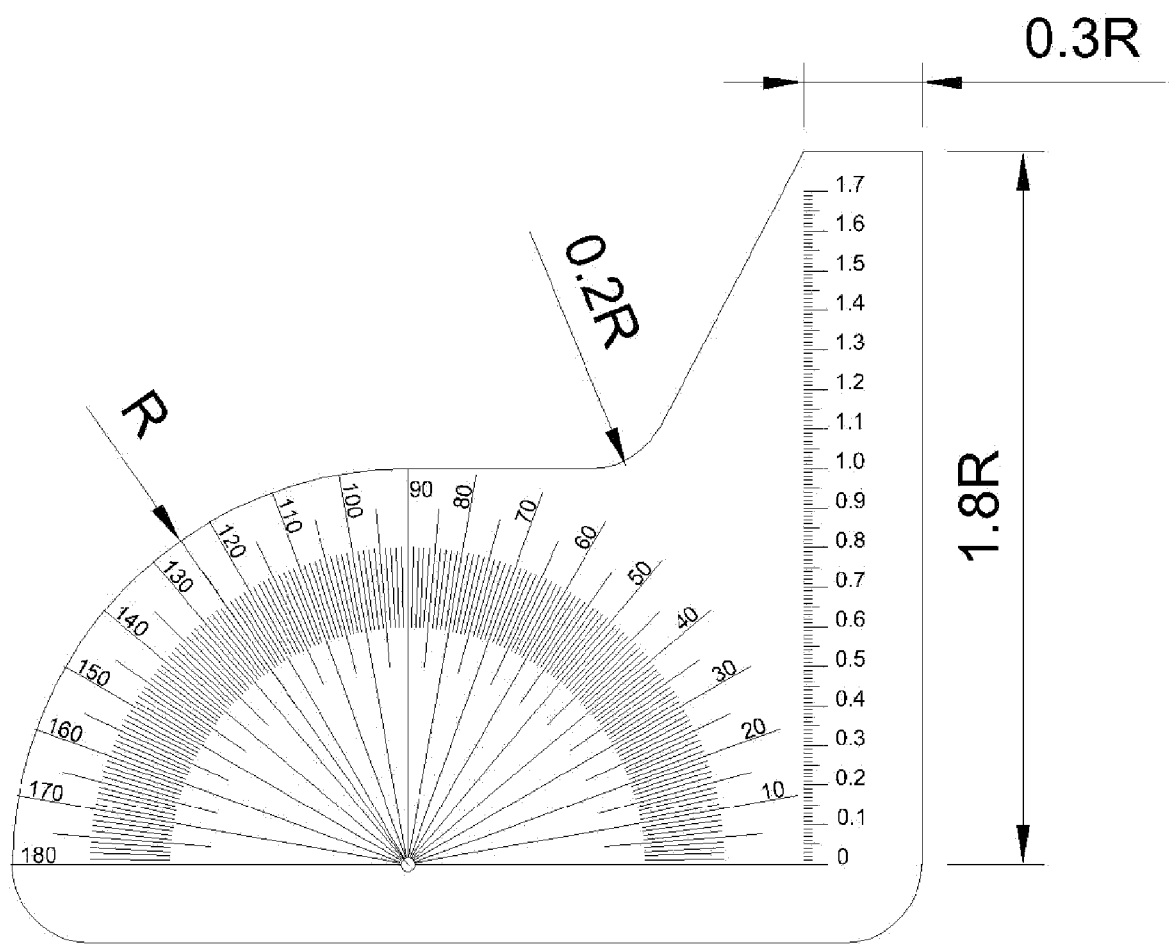
FIG. 23 Industrial drawing 4: The semi-protractor with the Slopes/Cuts Calculator

TRIGONOMETER

CROSS-REFERENCE TO RELATED APPLICATIONS

Refer to foreign priority information in the application data sheet.
Application number: 9921.
Filing date: Feb. 4, 2013
Country: Lebanon

STATEMENT REGARDING FEDERALLY SPONSORED RESEARCH OR DEVELOPMENT (IF APPLICABLE)

Not applicable.

REFERENCE TO SEQUENCE LISTING, A TABLE, A COMPUTER PROGRAM LISTING COMPACT DISC APPENDIX (IF APPLICABLE)

Not applicable

BACKGROUND OF THE INVENTION

The trigonometric circle or unit circle is a circle with a radius of one unit; it is widely used in mathematics, especially in trigonometry. Students confront lots of difficulties in understanding how the trigonometric circle works, and what can be done with this circle for the following reasons:
1. The trigonometric circle has a rotating radius, and it is very difficult to imagine something that rotates by only drawing it on papers and relying on students' imagination.
2. To draw a trigonometric circle, one needs to have a paper, a ruler, a pencil, a set square, a compass, and a protractor; the later procedure will waste the students' time.
3. Most of the students confront difficulties in understanding of basic trigonometric relationships between the sine and cosine of angles, especially those illustrated in FIG. 1.

Moreover, trigonometric functions are widely used in carpentry, whether in cuts, or to calculate the dimensions of windows, or for sloped roofs calculations, etc. Carpenters, however, don't know about trigonometric functions and their applications: indeed, carpenters need easy measurement tools, which enable them to find the required measurements with the minimal calculation effort. The common used instruments in carpentry are the layout square and the steel square; the layout square is very helpful in determining angles (similar to any protractor), and the steel square helps in determining slopes and cuts; however, the carpenter still needs to perform some calculations based on the rafter table found on the steel square itself. In addition, using large amount of instruments increases the complexity of the carpentry process, and most of the carpenters seek to have the minimal possible amount of such measurement tools.

The New Trigonometer is invented to address and solve the above point of pains for students and carpenters; thus, its usefulness doesn't rely in its capability to find the trigonometric functions, but instead by its application in places where the use of scientific calculators discerns to be useless: in education, when students are first taught about trigonometry, and in carpentry, where most of the carpenters don't know about trigonometry.

The New Trigonometer falls under the category of utility patent, as defined by the recent issue of PTU patent because it is a new and useful invention, and its usefulness is justified by its capability of addressing the above points of pain for students and carpenters.

BRIEF DESCRIPTION OF THE INVENTION

The New Trigonometer is a measurement tool used to find the trigonometric functions (sine, cosine and tangent) of a given angle by geometric visualization (see FIG. 2); an annotated representation of the trigonometer is shown in FIG. 3; as can be seen from the figure, the New Trigonometer adds to the conventional protractor the following three items:
1. The Tangent Calculator,
2. The Sin/Cos Calculator,
3. The Angle Tracking Device.

Application in Education:
1. The New Trigonometer is illustrative; using it, students can easily understand many aspects of trigonometry just by rotating the angle tracking device clockwise or counter clockwise as much as they want.
2. The New Trigonometer replaces the need to draw a trigonometric circle; thus, it will save students' time.
3. The New Trigonometer is accurate; using it, students will obtain the trigonometric functions geometrically; when students are taught that exact values of irrational functions (trigonometric functions are one of the irrational functions) can only be obtained by geometric representations, and not using a calculator (calculators give rounded and approximate values), they will be more interactive with the device (New Trigonometer.)

Application in Carpentry:
1. The New Trigonometer combines the benefits of the combination square, the layout square and the steel square (expect the fact that squares are used to draw right angles); the device could be used to accurately determine angles, as in the case of a layout square or a combination square, and will determine any kind of tangent (whether used for slopes or cuts, etc.) similarly to the steel square.
2. The New Trigonometer can be used to find the per unit dimensions (ratios of real dimensions) of the sides of any kind of triangle meshes and trellises found in wood structures, enabling its users to deduce the real lengths of all sides, by measuring only the length of one side.

BRIEF DESCRIPTION OF THE SEVERAL VIEWS OF THE DRAWING

FIG. 1 Some of the basic relationship used in trigonometry
This figure includes some of the basic trigonometric relationship that most of the students have difficulties in understanding.

FIG. 2 The New Trigonometer—front page
This figure is a general representation of the New Trigonometer; it could serve as the front page.

FIG. 3 Annotated representation of the New Trigonometer
This figure is an annotated representation of the invention where each element is labeled.

FIG. 4 Exploded view
This figure is an exploded view of the invention, showing how different elements are linked and assembled each one to the other.

FIG. 5 The Angle Tracking Device
This figure is an annotated representation, specific to the angle tracking device.

FIG. 6 The Tangent Calculator and the protractor as one entity

This figure is an annotated representation, specific to the entity composed of the Tangent Calculator and the protractor.

FIG. 7 The Sin/Cos Calculator in its vertical position

This figure represents the Sin/Cos Calculator, when aligned in its vertical position, for sine readings.

FIG. 8 The Sin/Cos Calculator in its horizontal position

This figure represents the Sin/Cos Calculator, when aligned in its horizontal position, for cosine readings.

FIG. 9 Example 1—Finding the sine of 130°

This figure is an illustration showing how the device can be used to find the sine of 130°.

FIG. 10 Example 2—Finding the arctan of −1.49

This figure is an illustration showing how the device can be used to find the reciprocal tangent of −1.49.

FIG. 11 Sine sign convention

This figure is a zoom in on the middle of the Sin/Cos Calculator, showing the sign convention specific to sine readings.

FIG. 12 Cosine sign convention

This figure is a zoom in on the middle of the Sin/Cos Calculator, showing the sign convention specific to cosine readings.

FIG. 13 Tangent sign convention

This figure is a zoom in on the middle of the Tangent Calculator, showing the sign convention specific to tangent readings.

FIG. 14 Carpentry application: Find the slope and the height of a sloped roof

This figure is an illustration showing how the device can be used in carpentry to find the slope and height of a sloped roof.

FIG. 15 Calculating the length of a triangle side, knowing any of the other side lengths This figure is an illustration showing how the device can be used in carpentry to find the length of a given side in a triangular mesh knowing the length of any of the two remaining sides.

FIG. 16 Sin/Cos Calculator variant: the Lengths Calculator

This figure represents the Lengths Calculator, which is a variant of the Sin/Cos Calculator; the Length Calculator is derived from the Sin/Cos Calculator by eliminating negative readings, and restricting reading on one side.

FIG. 17 The Slopes/Cuts Calculator (variant of the tangent calculator) and a semi-protractor as one entity This figure is an annotated representation of the entity composed of the Tangent Calculator variant, the Slopes/Cuts Calculator and a semi-protractor; the Slopes/Cuts Calculator is derived from the Tangent Calculator by eliminating negative readings.

FIG. 18 Angle Tracking Device variant

This figure represents a variant of the Tangent Calculator, where the upper end is removed.

FIG. 19 Variant of the Trigonometer, specific for carpentry

This figure represents the variant of the Trigonometer specific for carpentry; as can be seen from the figure, the protractor and Tangent Calculator (as one entity) are replaced by the Slopes/Cuts Calculator and a semi-protractor (as one entity). Moreover, the Sin/Cos Calculator is replaced by the Lengths Calculator, and the Angle Tracking device is also replaced by its variant.

FIG. 20 Industrial drawing 1: The Sin/Cos and Lengths Calculators

This figure represents the first industrial drawing in this application, specific for the Sin/Cos Calculator and the Lengths Calculator. The characteristics dimensions of these components are reported as function of the protractor radius; it is for the user to decide on the value of the radius, which suites his/her application.

FIG. 21 Industrial drawing 2: The Angle Tracking Device and its variant

This figure represents the second industrial drawing in this application, specific for the Angle Tracking Device and its variant. The characteristics dimensions of these components are reported as function of the protractor radius; it is for the user to decide on the value of the radius, which suites his/her application FIG. 22 Industrial drawing 3: The protractor with the Tangent Calculator This figure represents the third industrial drawing in this application, specific for the Tangent Calculator along with a protractor. The characteristics dimensions of these components are reported as function of the protractor radius; it is for the user to decide on the value of the radius, which suites his/her application FIG. 23 Industrial drawing 4: The semi-protractor with the Slopes/Cuts Calculator This figure represents the third industrial drawing in this application, specific for the Tangent Calculator along with a semi-protractor. The characteristics dimensions of these components are reported as function of the semi-protractor radius; it is for the user to decide on the value of the radius, which suites his/her application

DETAILED DESCRIPTION OF THE INVENTION

The invention consists of three components added to the conventional protractor: the Angle Tracking Device, the Tangent Calculator and the Sin/Cos Calculator. The protractor used, is a conventional full protractor, graduated in intervals of 1 degree, to increase the reading accuracy; 2 majors axis divide the protractor into 4 quadrants: the zero degrees axis (or relative horizontal), and the 90 degrees axis (or relative vertical.)

Angle Tracking Device:

The Angle Tracking Device, is an artificial hand used to track the angles on the protractor; it also contributes in tangent readings (see FIG. 5)

As can be seen from the exploded view of FIG. 4, the Angle Tracking Device is hinged with the protractor at its center using an articulation known as the center articulation; thus, the Angle Tracking Device can rotate freely around the center of the protractor, enabling its users to track and choose any angle between 0 and 360 degrees. Furthermore, the Angle Tracking Device has another articulation, known as the secondary articulation; the secondary articulation hinges the Angle Tracking Device with the Sin/Cos Calculator; it is important to note that the distance between the center of the trigonometer (center articulation), and the secondary articulation equals to the radius of the protractor.

It is clear from FIG. 4 that both ends of the Angle Tracking Device extend beyond the articulation limits: these extensions are needed for tangent readings. It can be noticed also, that the end starting from the center articulation, known as the lower end, extends more than the other end, known as the upper end: this asymmetry in the extensions is needed for negative tangent readings: indeed, when the angle tracking device is in the $1^{st}$ and $4^{th}$ quadrants, it is near the tangent calculator, and positive tangent readings are done with the upper end; whereas, when the angle tracking device is in the $2^{nd}$ and $3^{rd}$ quadrants, it is farthest from the tangent calculator, and negative tangent readings are done using the lower end which thus needs to be longer than the upper end.

Tangent Calculator:

The Tangent Calculator is a graduated ruler (see FIG. 6) attached vertically to the protractor, at its right side (near the $1^{st}$ and $4^{th}$ quadrants); it is used along with the Angle Tracking Device to find the tangents of angles. Therefore, to calculate the tangent of an angle, rotate the Angle Tracking Device to match the required angle; the Angle Tracking Device will be intersecting the Tangent Calculator at a value corresponding to the tangent of the required angle. Conversely, to find the arctan of a given value, tilt the Angle Tracking Device to intersect the Tangent Calculator with the required value: the corresponding angle with which the Angle Tracking Device has been aligned is the reciprocal tangent of the chosen value. An example to find the reciprocal tangent of −1.49 is shown in FIG. 9.

Since the tangent of 90 degrees equals to plus infinity, and the tangent of −90 degrees equals to minus infinity, the Tangent Calculator was restricted to readings between −1.7 and +1.7, corresponding to angles between −60 degrees and +60 degrees. The graduations are expressed in per unit values with respect to the radius of the protractor but not to a specific metric unit. For instance, if the radius of the protractor is 10 cm, then 1.7 units correspond to 17 cm. In fact, the unit by itself is not important as long as it is reported to the radius of the protractor because trigonometric functions are dimensionless ratios.

Sin/Cos Calculator:

The Sin/Cos Calculator is another graduated ruler used to find both the sine (vertical readings) and cosine (horizontal readings) of angle; the graduations are annotated in two directions to enable the user to do readings when the ruler is in its both vertical (see FIG. 7) and horizontal (see FIG. 8) positions; the graduation units are also reported to the radius of the protractor, similarly to the Tangent Calculator graduations.

As can be seen from the exploded view (FIG. 4), the Sin/Cos Calculator is hinged in its middle to the Angle Tracking Device, at the secondary articulation, as previously explained; therefore, the Sin/Cos Calculator can be easily tilted between its vertical and horizontal positions relative to the zero degrees axis. As a consequence, to calculate the sine (resp. cosine) of angle, rotate the Angle Tracking Device to match the required angle, then tilt the Sin/Cos Calculator vertically (resp. horizontally); the Sin/Cos Calculator will align with the zero degrees axis (resp. 90 degrees axis) at a value corresponding to the sine (resp. cosine) of the required angle. An example to find the sine of 130° is shown in FIG. 10. Conversely, to find the arcsin (resp. arccos) of a given value, tilt the Sin/Cos Calculator vertically (resp. horizontally), and align its position to intersect the zero degrees axis (resp. 90 degrees axis) at the required value: the corresponding angle with which the Angle Tracking Device has been aligned, is the reciprocal sine (resp. cosine) of the chosen value.

Specific Sign Conventions:

Near the middle of both Sin/Cos and Tangent Calculators, there are two arrows in opposite directions leading to positive and negative readings of sine, cosine and tangent. For instance, the sine readings are positive downward (readings below the secondary articulation when the angle is in the $1^{st}$ and $2^{nd}$ quadrants) and negative upward (readings above the secondary articulation when the angle is in the $3^{rd}$ and $4^{th}$ quadrants, see FIG. 11). Cosine readings are positive to the left (readings left of the secondary articulation when the angle is in the $1^{st}$ and $4^{th}$ quadrants) and negative to the right (readings right of the secondary articulation when the angle is in the $2^{nd}$ and $3^{rd}$ quadrants, see FIG. 12). Adversely, tangent readings are positive upward (when the angle is in the $1^{st}$ and $3^{rd}$ quadrants) and negative downward (when the angle is in the $2^{nd}$ and $4^{th}$ quadrants, refer to FIG. 13); this sign convention specific to the trigonometer is very crucial to students, since graduations are graved without signs on the Sin/Cos and Tangent Calculators.

Application in Education:

1. The student can use the device to find the sine, cosine and tangent of angles as previously described.
2. For a better understanding of the first 2 formulas in FIG. 1:
   a. Choose an angle arbitrary.
   b. Starting from the chosen angle, rotate the Angle Tracking Device 360 degrees clockwise or counter clock wise (as many times as you want.)
   c. You will realize that the Angle Tracking Device will retain its initial position, and thus the new angle will have the same cosine and sine of the initial angle.
3. For a better understanding of the $3^{rd}$ formula in FIG. 1:
   a. Choose an angle arbitrary.
   b. Starting from the chosen angle, rotate the Angle Tracking Device 180 degrees clockwise or counter clock wise (as many times as you want.)
   c. You will realize that the Angle Tracking Device will remain intersecting the Tangent Calculator at the initial value, and thus the new angle will have the same tangent of the initial angle.
4. For a better understanding of the $4^{th}$ formula in FIG. 1:
   a. Choose an angle arbitrary.
   b. Read the cosine of the corresponding angle, respecting the sign convention (as previously described.)
   c. Rotate the Angle Tracking Device to be symmetrical to the initial angle with respect to the zero degrees axis (negative of the initial angle).
   d. Do the cosine readings again with the new angle: you will realize that both angles have the same cosine in absolute values, and both cosines have the same sign (same cosine readings.)
5. For a better understanding of the $5^{th}$ formula in FIG. 1:
   a. Repeat steps 4.a to 4.c, but do sine readings instead of cosine readings.
   b. Do the sine readings again with the new angle: you will realize that both angles have the same sine in absolute values, but they have opposite signs.
6. For a better understanding of the $6^{th}$ (resp. $7^{th}$) formula in FIG. 1:
   a. Choose an angle arbitrary.
   b. Read the cosine (resp. sine) of the corresponding angle, respecting the sign convention previously described.
   c. Without tilting the Sin/Cos Calculator, rotate the Angle Tracking Device 90° counter clockwise (the secondary articulation is not loose, so the same angle between the Angle Tracking Device and the Sin/Cos Calculator could be conserved even when rotating the Angle Tracking Device.)
   d. You will realize that the Sin/Cos Calculator, in its initial position, will be pointing to the sine (resp. cosine) of the new angle.
7. While doing any reading (whether of sine, cosine, tangent or their reciprocal angles), students can be told that they are visualizing the exact values of these functions. That is because trigonometric functions are irrational functions, and their exact values can only be obtained accurately by geometric representations. Furthermore, it is important to note that calculators give approximate values of the trigonometric functions (rounded to a value depending on the calculator accuracy). Therefore, it is important to emphasis that the intension from the use of the New Trigonometer here is educative and not to do calculations.
8. Students can always do the exercise of finding the trigonometric functions previously addressed using the conventional method (by drawing it on paper) and then using the trigonometer and comparing the results. The benefits can be summarized as follows:

a. Material saving: students will save paper.
b. Saving time: instead of using a paper, a compass (to draw the circle), a pencil and a set-square to draw the axis of the unit circle and a protractor to determine the angle, they could simply use the New Trigonometer.
c. Ease of use: instead of erasing and re-drawing to do multiple readings, students can simple rotate the Angle Tracking Device and tilt the Sin/Cos Calculator.
d. The scale issue: when drawing a unit circle, the student needs to predetermine the unit prior of the drawings (example one unit corresponds to 5 cm); then; when finding the sine, cosine or tangent of a given value, the student needs to measure the read value and divide it by the unit length (here 5 cm) to find the per unit of the ratio (trigonometric functions are unit-less ratios). This issue is solved using the New Trigonometer, since the unit is predetermined, and students can make direct readings of the sine, cosine and tangents of angles.
e. The issue of imagination: the unit circle has a rotating radius; it is very difficult to imaging something that rotates by drawing it on paper and relying on the students' imagination. On the other hand, when using the New Trigonometer, the students can expand their imagination and understanding by interacting with the device rotating components (Angle Tracking device and Sin/Cos Calculator.)

Application in Carpentry:

1. To find the slope of a sloped wood structure (see FIG. 14):
   a. Pose the center articulation at any point of the wood structure edge.
   b. After making sure that the zero degrees axis is horizontal, rotate the Angle Tracking Device parallel to the direction of the wood structure.
   c. The Angle Tracking Device intersects the Tangent Calculator with the slope of the wood structure.
2. To find the height of a sloped roof structure (see FIG. 14):
   a. Repeat steps 1.a and 1.b.
   b. Tilt the Sin/Cos Calculator to its vertical direction; the aligned value with the zero degrees acis (sine reading) corresponds to the ratio of the roof height to the sloped length.
   c. Multiply the read value with the sloped length: you will get the sloped roof height.
3. To find the slope of a cut:
   a. Pose the center articulation at any point of the edge of the cut.
   b. Repeat steps 1.b and 1.c.
4. To find the length of one side of a triangular articulation structure—the target side—knowing the length of another side, the reference side (see FIG. 15):
   a. Align the zero angle line of the trigonometer with the third side of the triangular articulation (Step 1, FIG. 15.) One condition is that the angle between the reference side and the third side needs to be an acute angle.
   b. Open the Angle Tracking Device at an angle equal to the angle intercepted between the reference side and the third side. In other words, the angle tracking device needs to be tilted to become parallel to the reference side (Step 2, FIG. 15.)
   c. The center articulation remaining posed at the third side, translates the New Trigonometer so that the secondary articulation intersects with the target side (Step 3, FIG. 15.)
   d. Tilt the Sin/Cos Calculator so it intersects the zero degrees axis; the intersected value corresponds to the ratio of the target side length to the known length of the reference side (Step 4, FIG. 15.)
   e. Multiply the read value with the length of the reference side: you will get the target side length.

The New Trigonometer Variants:

Sin/Cos Variant 1: Lengths Calculator

The sign convention previously addressed is of less importance for carpenters, since slopes, lengths and dimensions are always positive values. In addition, the distinction between cosine and sine readings is not important since the Sin/Cos Calculator could be used from a single side to obtain the required per unit length. As a consequence, a variant of the Sin/Cos Calculator can be manufactured specifically for carpenters; it will have the following characteristics (see FIG. 16)

1. One of the two sides of the Sin/Cos Calculator will be trimmed; the remaining part will remain hinged to the Angle Tracking Device.
2. The graduation annotation at the Sin/Cos Calculator will be from a single side and the sign conversion omitted.
3. The Sin/Cos Calculator will take the name of Lengths Calculator.

Tangent Calculator Variant:

In carpentry, and following the same above spirit, a variant of the Tangent Calculator can also be used and will have the following characteristics (see FIG. 17):

1. The lower part of the Tangent Calculator will be trimmed, and the negative graduations as well as the sign conversion will be eliminated (lower part of the protractor is also trimmed.)
2. The Tangent Calculator will take the name of Slopes/Cuts Calculator.
3. Since negative numbers do not exist in real applications, the protractor is reduced to half protractor.

Angle Tracking Device Variant

In carpentry applications, and since negative tangent readings do not exist, the lower end of the Angle Tracking Device is not needed anymore; this variant of the Angle Tracking Device will be obtained by trimming the lower end of the Angle Tracking Device (see FIG. 18.)

The New Trigonometer variant specific for carpentry will lose the educational benefits found in the original version of the New Trigonometer. It is mentioned here, however, since it is dependent of the New Trigonometer and will save materials and will reduce the cost of the product when used in carpentry (see FIG. 19); it is important to note that the usage instructions previously described will remain applicable for this variant. Moreover, the New Trigonometer, in its initial description, can be used at any time in carpentry.

Manufacturing Specifications

The New Trigonometer could be manufactured in many sizes and using multiple materials; however, our recommendations are the following:

Sizes:

1. A small size for individual student use (protractor diameter 5 cm.)
2. A big size for teachers' use in classes (protractor diameter 15 cm.)
3. A moderate size for carpentry applications (protractor diameter 10 cm.)

All the characteristic dimensions of the New Trigonometer are expressed in terms of the radius of the protractor. Therefore when mass producing the device, any scaling in its size can be done by simply increasing or decreasing the value of the radius; this change in the value of the radius will be reflected in the size of the New Trigonometer. As a consequence, the user will have the choice to manufacture a trigonometer that suits his/her needs.

Materials:

1. The recommended material for educations applications is the PS, polystyrene. In addition, the recommended material for the articulations is copper.
2. The recommended materials for carpentry applications (heavy duty) are either ply wood or steel.

Industrial Drawings:

The industrial drawings are represented from FIG. 20 to FIG. 23; they consist of plan drawings (2D) since the third dimension is simply the thickness of the assemblies. As can be seen from the figures, all characteristics dimensions are reported to the radius of the protractor. Moreover, neither scales nor units are specified since they will not affect the shape of the product. Moreover, the thicknesses of the different components of one assembly (they could have different thicknesses or the same thickness) as well as the dimensions of the holes of the articulations will be determined by the manufacturer: the chosen values need to represent a compromise between cost and material reduction on one hand, and the product robustness on the other hand. Finally, the choice of the graduations style is also left to the manufacturer, with the following restrictions:

1. The graduation and numbers need to be visible and readable.
2. The sign conventions previously addressed need to be shown on the device.
3. The angle graduations can be expressed in degrees, radiant or grad with the condition of having accuracy comparable to 1 degree.
4. The linear graduations presented need to be reported to the radius of the protractor as previously stated, but not chosen arbitrarily.

The invention claimed is:

1. A measuring devise made of the following components:
a full protractor, including markings corresponding to angle values in degrees and two bisecting lines, which divide the protractor into 4 quadrants similar to a unit circle;
a graduated rectangular ruler, named Tangent Calculator, attached from its middle (zero point) vertically to the said protractor, at its right side (near the $1^{st}$ and $4^{th}$ quadrants);
an arm, named Angle Tracking Device, pivotally joined from its middle to the origin of the said protractor and extending beyond the protractor circumference;
a second graduated rectangular ruler, named Sin/Cos Calculator, pivotally joined from its middle (zero point) to the said Angle Tracking Device, apart from the center of the protractor at a distance equal to the protractor radius;
wherein the Angle Tracking Device can be rotated and aligned at any given angle of the protractor;
wherein the graduations of the Tangent Calculator are in per unit values with respect to the radius of the protractor; they are annotated by numbers in the vertical direction;
wherein the graduations of the Sin/Cos Calculator are in per unit values with respect to the radius of the protractor; they are annotated by numbers in two directions to enable the user to do readings when the ruler is in its both vertical and horizontal positions;
wherein near the zero points of both the Sin/Cos and Tangent Calculators, a sign convention, defined by two arrows in opposite directions, is put to guide the users to positive and negative readings of sine, cosine and tangent;
wherein the trigonometric tangent of a given angle can be obtained by aligning the Angle Tracking Device with the said angle, then by reading the value on the Tangent Calculator corresponding to the intersection of the Angle Tracking Device with the Tangent Calculator; consequently, the reciprocal tangent of a given value can be obtained by rotating the Angle Tracking Device so it intersects the Tangent Calculator at the said value, then by reading the angle on the protractor with which the Angle Tracking Device has been aligned;
wherein the trigonometric sine (respectively cosine) of a given angle can be obtained by aligning the Angle Tracking Device with the said angle, then by tilting the Sin/Cos Calculator vertically (respectively horizontally) and by reading the value on the Sin/Cos Calculator corresponding to the intersection between the Sin/Cos calculator with the horizontal (respectively vertical) bisecting line;
consequently, the reciprocal sine (respectively cosine) of a given value can be obtained by tilting the Sin/Cos calculator vertically (respectively horizontally), then translating it so it intersect the horizontal (respectively vertical) bisecting line at the said value; as a result of the later translation, the Angle Tracking Device will be forced to rotate and to align with an angle on the protractor corresponding to the reciprocal sine (respectively cosine) of the said value.

2. The measuring device of claim 1, wherein the full protractor is replaced by a semi protractor; wherein half of the Tangent Calculator is eliminated, enabling only positive tangent readings; wherein half of the Sin/Cos Calculator is eliminated, enabling only positive readings of the sine and the cosine; wherein the side with no pivots of the Angle Tracking Device is eliminated;
wherein the sine convention on both the Sin/Cos and Tangent Calculators are eliminated.

3. The measuring device of claim 1, wherein the protractor markings correspond to angle values in radiant or grad.

4. The measuring device of claim 1, wherein the material forming its different components comprises wood, plastic, metal or combined thereof.

* * * * *